United States Patent
Reddy et al.

(10) Patent No.: US 9,127,193 B2
(45) Date of Patent: *Sep. 8, 2015

(54) LEWIS ACID AS GELATION RETARDER FOR CROSSLINKABLE POLYMER COMPOSITIONS

(71) Applicant: Halliburton Energy Services, Inc., Houston, TX (US)

(72) Inventors: B. Raghava Reddy, Duncan, OK (US); Larry S. Eoff, Duncan, OK (US); Julio Estuardo Vasquez, Norman, OK (US); Eldon Dwyann Dalrymple, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,151

(22) Filed: Oct. 31, 2012

(65) Prior Publication Data

US 2013/0056199 A1 Mar. 7, 2013

Related U.S. Application Data

(63) Continuation of application No. 12/717,004, filed on Mar. 3, 2010, now Pat. No. 8,322,421.

(51) Int. Cl.
| | | |
|---|---|---|
| *C09K 8/035* | (2006.01) | |
| *C09K 8/588* | (2006.01) | |
| *C09K 8/512* | (2006.01) | |
| *C09K 8/508* | (2006.01) | |
| *C09K 8/88* | (2006.01) | |

(52) U.S. Cl.
CPC .............. *C09K 8/512* (2013.01); *C09K 8/5083* (2013.01); *C09K 8/882* (2013.01); *C09K 8/887* (2013.01)

(58) Field of Classification Search
CPC ....... E21B 21/10; E21B 21/106; E21B 21/12; E21B 21/16; E21B 23/01; E21B 23/02; E21B 23/065; E21B 27/02; E21B 28/00; E21B 29/002; E21B 29/005; E21B 29/06; E21B 31/113; E21B 33/00; E21B 33/035; E21B 41/0078; E21B 41/0085; E21B 43/01; E21B 43/0107; E21B 43/025; E21B 43/04; E21B 43/088; E21B 43/103; E21B 43/105; E21B 43/1185; E21B 43/124; E21B 43/128; E21B 43/129; E21B 43/164; C09K 8/52; C09K 8/40; C09K 8/584; C09K 8/588; C09K 8/68; C09K 9/685; C09K 8/80; C09K 8/805; C09K 8/86; C09K 2208/02; C09K 2208/08; C09K 2208/18; C09K 2208/30; C09K 8/00; C09K 8/02
See application file for complete search history.

(56) References Cited

U.S. PATENT DOCUMENTS

| | | | |
|---|---|---|---|
| 4,773,481 A | 9/1988 | Allison et al. | |
| 5,203,834 A | 4/1993 | Hutchins et al. | |
| 5,339,269 A | 8/1994 | Takagi et al. | |
| 5,351,651 A | 10/1994 | Ushio et al. | |
| 5,480,933 A | 1/1996 | Fox et al. | |
| 5,617,920 A * | 4/1997 | Dovan et al. .................. | 166/295 |
| 5,836,392 A | 11/1998 | Urlwin-Smith | |
| 5,905,100 A | 5/1999 | Moradi-Araghi | |
| 6,176,315 B1 * | 1/2001 | Reddy et al. .................. | 166/295 |
| 6,189,615 B1 | 2/2001 | Sydansk | |
| 6,192,986 B1 | 2/2001 | Urlwin-Smith | |
| 6,196,317 B1 * | 3/2001 | Hardy ........................... | 166/295 |
| 6,476,169 B1 | 11/2002 | Eoff et al. | |
| 6,607,035 B1 | 8/2003 | Reddy et al. | |
| 6,823,939 B2 | 11/2004 | Bouwmeester et al. | |
| 6,838,417 B2 | 1/2005 | Bouwmeester et al. | |
| 6,889,768 B2 | 5/2005 | Girgenti | |
| 6,936,574 B2 | 8/2005 | Dao et al. | |
| 6,981,552 B2 | 1/2006 | Reddy et al. | |
| 7,091,160 B2 | 8/2006 | Dao et al. | |

(Continued)

FOREIGN PATENT DOCUMENTS

| | | |
|---|---|---|
| EP | 0577060 A2 | 1/1994 |
| EP | 0604988 A2 | 7/1994 |

(Continued)

OTHER PUBLICATIONS

International Search Report for PCT/GB2011/000296 issued May 26, 2011.

(Continued)

*Primary Examiner* — Susannah Chung
*Assistant Examiner* — Kumar R Bhushan
(74) *Attorney, Agent, or Firm* — Holly Soehnge; Baker Botts L.L.P.

(57) ABSTRACT

A treatment fluid for a well including: (a) a water-soluble polymer, wherein the water-soluble polymer comprises a polymer of at least one non-acidic ethylenically unsaturated polar monomer; (b) an organic crosslinker comprising amine groups, wherein the organic crosslinker is capable of crosslinking the water-soluble polymer; (c) a Lewis acid; and (d) water; wherein the treatment fluid is a crosslinkable polymer composition. According to an embodiment, a method for blocking the permeability of a portion of a subterranean formation penetrated by a wellbore is provided, the method including the steps of: (a) selecting the portion of the subterranean formation to be treated; (b) selecting estimated treatment conditions, wherein the estimated treatment conditions comprise temperature over a treatment time; (c) forming the treatment fluid; and (d) injecting the treatment fluid through the wellbore into the portion of the subterranean formation.

15 Claims, No Drawings

(56) References Cited

U.S. PATENT DOCUMENTS

| | | |
|---|---|---|
| 7,220,708 B2 | 5/2007 | Zamora et al. |
| 7,267,174 B2 | 9/2007 | Gonsveld et al. |
| 7,331,390 B2 | 2/2008 | Eoff et al. |
| 2003/0000697 A1 | 1/2003 | Bayliss et al. |
| 2004/0163813 A1 | 8/2004 | Slabaugh et al. |
| 2005/0230113 A1 | 10/2005 | Eoff et al. |
| 2006/0234871 A1* | 10/2006 | Dalrymple et al. .......... 507/211 |
| 2006/0278390 A1 | 12/2006 | Reddy et al. |
| 2006/0289158 A1 | 12/2006 | Reddy et al. |
| 2007/0235192 A1* | 10/2007 | Michaux et al. .............. 166/293 |
| 2008/0058229 A1 | 3/2008 | Berkland |
| 2008/0223578 A1 | 9/2008 | Berkland et al. |

FOREIGN PATENT DOCUMENTS

| | | |
|---|---|---|
| EP | 1201874 A2 | 2/2002 |
| EP | 1394353 A2 | 3/2004 |
| WO | WO 9500742 | 1/1995 |
| WO | WO/2007/083144 | 7/2007 |

OTHER PUBLICATIONS

International Search Report for PCT/GB2011/000352 issued Jun. 21, 2011.

International Search Report for PCT/GB2011/00282 issued Jun. 8, 2011.

International Search Report for PCT/GB2011/000297 issued May 26, 2011.

Al-Muntasheri. "Gelatin Kinetics and Performance Evaluation of an Organically Crosslinked Gel at High Temperature and Pressure" SPE 104071, Sep. 2008.

"Polymer and Polymer-Gel Water Shutoff Treatments, What It Takes to Be Successful and Illustrative in the Field" PTTC Texas Regions Workshop, Aug. 25, 2004, Houston, TX.

International Preliminary Report on Patentability for PCT/GB2011/000296 issued Sep. 13, 2012.

\* cited by examiner

LEWIS ACID AS GELATION RETARDER FOR CROSSLINKABLE POLYMER COMPOSITIONS

CROSS-REFERENCE TO RELATED APPLICATIONS

This application is a continuation of U.S. application Ser. No. 12/717,004 filed on Mar. 3, 2010.

BACKGROUND

1. Technical Field

The invention generally relates to producing crude oil or natural gas from a well drilled into a subterranean formation. More particularly, the invention is directed to improved treatment fluids and methods that are capable of forming crosslinked gels in subterranean formations. A particular application of the invention is for conformance control. Production of unwanted water from a hydrocarbon producing well can be a limiting factor in the productive life of a well.

2. Background Art

Oil or gas is naturally occurring in certain subterranean formations. A subterranean formation having sufficient porosity and permeability to store and transmit fluids is referred to as a reservoir. A subterranean formation that is a reservoir for oil or gas may be located under land or under a seabed offshore. Oil or gas reservoirs are typically located in the range of a few hundred feet (shallow reservoirs) to a few tens of thousands of feet (ultra-deep reservoirs) below the ground or seabed.

In order to produce oil or gas, a wellbore is drilled into a subterranean formation that is an oil or gas reservoir. A wellbore can include an openhole or uncased portion. A wellbore can have vertical and horizontal portions, and it can be straight, curved, or branched.

Various types of treatments are commonly performed on wells or subterranean formations penetrated by wells. For example, stimulation is a type of treatment performed on a subterranean formation to restore or enhance the productivity of oil or gas from the subterranean formation. Stimulation treatments fall into two main groups: hydraulic fracturing and matrix treatments. Fracturing treatments are performed above the fracture pressure of a subterranean formation to create or extend a fracture in the rock. The fracture is propped open with sand or other proppant to provide a highly permeable flow path between the formation and the wellbore. Matrix treatments are performed below the fracture pressure of a subterranean formation. Matrix treatments can include, for example, treatments to consolidate a matrix of unconsolidated rock particles so that less particulate is produced with the produced hydrocarbon or to alter the permeability of the matrix of a subterranean formation to improve fluid flow through the formation.

When oil or gas is produced from subterranean formations, water often accompanies the produced oil or gas. The source of the water can be a water producing zone communicating with the oil or gas producing formation through a fracture, high-permeability streak, high-permeability zone, and the like, or it can be caused by a variety of other occurrences which are well known to those skilled in the art, such as water coning, water cresting, bottom water, lateral channeling, channeling at the wellbore, etc.

In addition, the source of the water can be the result of waterflood techniques, which is a type of secondary recovery to improve production of oil. Secondary recovery is the second stage of hydrocarbon production during which an external fluid such as water, gas, or alternating both fluids is injected into the reservoir through one or more injection wells penetrating a subterranean formation that has fluid communication with a production well. The purpose of secondary recovery is to maintain reservoir pressure and to displace hydrocarbons toward the wellbore of a production well. In waterflooding, water is injected into a reservoir to displace residual oil. The water from injection wells sweeps the displaced oil toward a production well. Potential problems associated with waterflood techniques include inefficient recovery due to variable permeability and other conditions affecting fluid transport within the reservoir. Early water breakthrough to the production well may cause production and surface processing problems.

Conformance control is a type of well treatment directed to improve the injection or production profile of a well. Conformance control is sometimes referred to as profile modification. Conformance control encompasses procedures that enhance recovery efficiency, such as by reducing the proportion of water produced with the oil or gas. Problems of high water production caused by permeability variations in a subterranean formation have been corrected, for example, by reducing the permeability of a portion of the subterranean formation having high permeability and low oil or gas content.

There are at least two types of methods for reducing the permeability of a portion of a subterranean formation. One method involves the injection of a polymer that is capable of being crosslinked to form a gel within the matrix of the subterranean formation. The gel physically blocks fluid flow through the portion of the formation in which the gel has been placed, directing all fluid flow around the portion of the formation or inducing the production from the non-drained portions. This method is sometimes referred to as permeability blocking. As a result of this kind of treatment, fluid flow is directed through other portions of the subterranean formation having lower permeability. The polymer compositions for use in this method are sometimes referred to as crosslinkable polymer compositions.

Another method for reducing the permeability of a subterranean formation involves the injection of a chemical that attaches to adsorption sites on the rock surfaces within the matrix of the subterranean formation. The attached chemical is adapted to reduce the water permeability through the formation without substantially reducing the hydrocarbon permeability. These chemicals are sometimes referred to as relative permeability modifiers.

Crosslinkable polymer compositions have included, for example, water-soluble polymers including copolymers of acrylamide and acrylic acid crosslinked with chromium or other transition metal ions. In accordance with an early technique, an aqueous solution of one or more of the polymers or copolymers mixed with a crosslinking metal ion is injected into the subterranean formation and allowed to cross-link therein. However, it has heretofore been found that the metal cross-linked gels formed have often been ineffective at high temperatures, i.e., at temperatures above about 180° F. (82° C.) because of the instability of the crosslinker or polymer. This has resulted in uncontrolled crosslinking rates (too rapid), crosslinker precipitation, polymer degradation, or inefficient solution propagation through the rock matrix. In attempts to correct these problems, the crosslinking metal ion has been coordinated with a ligand such as acetate or propionate to slow the reaction of the metal ion with the polymer. While this and other techniques have been utilized successfully, the use of some metal ions, e.g., chromium, has adverse environmental effects, and the metal ion used can be adsorbed by formation materials whereby it is prevented from functioning to crosslink the polymer.

U.S. Pat. No. 4,773,481 to Allison et al. entitled "Reducing Permeability of Highly Permeable Zones in Underground Formations," issued on Sep. 27, 1988, which is incorporated herein by reference in its entirety, describes a process for reducing the permeability of a subterranean formation by the cross-linking of water-soluble polymers of polyalkylene imines and polyalkylenepolyamines with certain polymers which are anionic or hydrolyzable to form anionic polymers. Examples of the anionic polymers are polyacrylamide and alkylpolyacrylamides, copolymers of polyacrylamide and alkylpolyacrylamides with ethylene, propylene and styrene, polymaleic anhydride and polymethylacrylate, and hydrolysis products thereof. As described in the patent, when the water-soluble polymer and the anionic polymer are mixed, a viscous gel is quickly formed. In use, a solution of the water-soluble polymer is pumped into the subterranean formation first, followed by water to displace the water-soluble polymer from the wellbore to thereby prevent premature gelling upon introduction of the anionic polymer. Thereafter, the anionic polymer is pumped into the formation. This three-step procedure has a number of disadvantages in practice and is costly to perform, but it is necessary because the water-soluble polyalkylene imine or polyalkylenepolyamine reacts very quickly with the anionic polymer and cannot be premixed without premature gelation.

U.S. Pat. No. 5,836,392 having named inventor Phillip Lance Urlwin-Smith, entitled "Oil And Gas Field Chemicals," issued on Nov. 17, 1998, and assigned of record to Halliburton Energy Services, Inc., which is incorporated herein by reference in its entirety, discloses a method for conformance control of a reservoir comprising injecting into a zone of the reservoir an aqueous solution of a co-polymer comprising at least one ethylenically unsaturated polar monomer and at least one copolymerizable ethylenically unsaturated ester formed from a hydroxy compound of the formula ROH wherein R is a selected alkyl group, alkenyl group, cycloalkyl group, aryl group or such groups substituted with from 1 to 3 hydroxyl, ether or thio ether groups or a heterocyclic or selected heterocyclic alkylene group and at least one heteroatom selected from oxygen, nitrogen and sulfur and a selected alkenoic or aralkenoic carboxylic acid or sulfonic or phosphoric acid together with a crosslinking agent comprising a multi-valent metal ion capable of crosslinking an acrylic acid polymer to form a viscous gel. The injected fluid is flowed through at least a portion of a high permeability region within said zone wherein it is heated to an elevated temperature whereupon crosslinking of the polymers occurs to form a substantially non-flowable gel within said high permeability region. The crosslinking of the injected fluid to form the non-flowable gel within the formation reduces the permeability of said region in said zone.

U.S. Pat. No. 6,192,986 to Phillip Lance Urlwin-Smith, entitled "Blocking Composition For Use In Subterranean Formation," issued on Feb. 27, 2001, and assigned of record to Halliburton Energy Services, Inc., which is incorporated herein by reference in its entirety, describes a way of avoiding the use of metal ion cross-linking agents and of controlling the gelling rate of polymers whereby premixes of polymer and a gelling agent can be made and safely injected into a downhole formation without serious risk of premature gelation. The composition comprises a water-soluble copolymer comprising (i) at least one non-acidic ethylenically unsaturated polar monomer and (ii) at least one polymerizable ethylenically unsaturated ester; and (iii) at least one organic gelling agent, characterized in that the gelling agent is a polyalkyleneimine, polyfunctional aliphatic amine, an aralkylamine, or a heteroaralkylamine. The gelling agents are free from metal ions, and are preferably water-soluble polymers capable of cross-linking the copolymers. Among the preferred water-soluble polymers for use as gelling agents are polyalkyleneimines, polyalkylenepolyamines, and mixtures thereof. Additional details concerning these polymers and their preparation are disclosed in U.S. Pat. No. 3,491,049, which is also incorporated herein by reference in its entirety. The preferred polyalkylenepolyamines are the polymeric condensates of lower molecular weight polyalkylenepolyamines and a vicinal dihaloalkane. The polyalkyleneimines are best illustrated by polymerized ethyleneimines or propyleneimine. The polyalkylenepolyamines are exemplified by polyethylene and polypropylenepolyamines. Other gelling agents which can be used include water-soluble polyfunctional aliphatic amines, aralkylamines, and heteroaralkylamines optionally containing other hetero atoms. The method of conformance control of a subterranean reservoir comprises: (a) injecting into a formation an aqueous solution of a composition of the invention; (b) allowing the solution to flow through at least one permeable zone in said formation; and (c) allowing the composition to gel. As the solution is pumped downhole and permeates into the zone, it heats up and eventually reaches the downhole temperature after which gelling occurs.

U.S. Pat. No. 6,176,315 to B. R. Reddy, Larry Eoff, Jiten Chatterji, San T. Tran, and Dwyann Dalrymple, entitled "Preventing Flow Through Subterranean Zones," issued on Jan. 23, 2001, and assigned of record to Halliburton Energy Services, Inc., which is incorporated herein by reference in its entirety, discloses methods of preventing the flow of water or gas or both through a subterranean zone having a high temperature and a depth such that a long pumping time is required to place a sealing composition therein. The methods basically comprise the steps of preparing a polymeric sealing composition comprised of water, a cross-linking agent, and a selected water-soluble polymer, which reacts with the cross-linking agent and forms a sealing gel which is stable for a desired period of time at the temperature of the zone and has a pumping time before gelation in the presence of the cross-linking agent, whereby the composition can be pumped to the depth of the zone and placed therein. Thereafter, the sealing composition is pumped into the zone and allowed to form a sealing gel therein. A "gelation accelerating agent" can be utilized to reduce pumping time before gelation at a given temperature. The gelation accelerating agent can be a pH control compound such as an alkali metal carbonate, bicarbonate or hydroxide, a mineral acid such as hydrochloric acid, an organic acid such as acetic acid, a Lewis acid such as boric acid or other compounds such as ammonium chloride, urea and lactose. Of these, boric acid is preferred. When utilized, boric acid is added to the sealing compositions of this invention in a general amount in the range of from about 0.005% to about 0.1% by weight of the composition.

U.S. Pat. No. 6,196,317 to Mary Anne Hardy, entitled "Method and Composition for Reducing the Permeabilities of Subterranean Zones," issued on Mar. 6, 2001, and assigned of record to Halliburton Energy Services, Inc., which is incorporated herein by reference in its entirety, describes the steps of introducing an aqueous solution of a chelated organic gelling agent and a copolymer of a non-acidic ethylenically unsaturated polar monomer and an ethylenically unsaturated ester into a subterranean zone, and then allowing the aqueous solution to form a cross-linked gel in the zone. The chelated organic gelling agent is comprised of a water-soluble polyalkylene imine chelated with a metal ion, preferably polyethylene imine chelated with zirconium. The non-acidic ethylenically unsaturated polar monomer in the copolymer is an amide of an unsaturated carboxylic acid, preferably acrylamide, and the ethylenically unsaturated ester in the copolymer is formed of a hydroxyl compound and an ethylenically unsaturated carboxylic acid such as acrylic acid, methacrylic acid and the like. A preferred unsaturated ester is t-butyl acrylate. In a further aspect, instead of utilizing the above-described copolymer which is rapidly cross-linked by the chelated gelling agent once the chelated gelling agent disassociates, the copolymer can be stabilized whereby it does not cross-link as rapidly at high temperatures and also has greater long-term gel strength after being cross-linked by forming it into a terpolymer or a tetrapolymer. That is, instead of a copolymer, the above-described non-acidic ethylenically unsaturated polar monomer, preferably acrylamide, and the ethylenically unsaturated ester, preferably t-butyl acrylate, are reacted with AMPS® (2-acrylamido-2-methylpropane sulfonic acid) and/or N-vinylpyrrolidone to produce a terpolymer, e.g., polyacrylamide/t-butyl acrylate/AMPS® or polyacrylamide/t-butyl acrylate/N-vinylpyrrolidone or a tetrapolymer, e.g., polyacrylamide/t-butyl acrylate/AMPS®/N-vinylpyrrolidone. The most preferred terpolymer is polyacrylamide/t-butyl acrylate/N-vinylpyrrolidone. The compositions for reducing the permeability of a subterranean zone are basically comprised of water, a copolymer of an ethylenically unsaturated polar monomer, and an ethylenically unsaturated ester or a terpolymer or tetrapolymer of the aforesaid polar monomer and ester with AMPS® and/or N-vinylpyrrolidone, and a chelated organic gelling agent.

As an example of a relative permeability modifier, U.S. Pat. No. 6,476,196 to Larry Eoff, Raghava Reddy, and Eldon Dalrypmple, entitled "Methods of Reducing Subterranean Formation Water Permeability," issued Nov. 5, 2002, and assigned to Halliburton Energy Services, Inc., which is incorporated herein by reference in its entirety, discloses introducing into the formation a water flow resisting chemical which attaches to adsorption sites on surfaces within the porosity of the formation and reduces the water permeability thereof without substantially reducing the hydrocarbon permeability thereof. The water flow resisting chemical is comprised of a polymer of at least one hydrophilic monomer and at least one hydrophobically modified hydrophilic monomer.

U.S. Pat. No. 6,838,417 to Ron C. M. Bouwmeester and Klass A. W. Van Gijtenbeek, entitled "Compositions and Methods Including Formate Brines for Conformance Control," issued Jan. 4, 2005, and assigned to Halliburton Energy Services, Inc., which is incorporated herein by reference in its entirety, discloses compositions and methods are provided for reducing the permeability of subterranean zones. More particularly, water-soluble polymeric compositions which form crosslinked gels in the zones. In general, the composition comprises (a) at least one water-soluble polymer; (b) at least one organic gelling agent capable of cross-linking the water-soluble polymer; and (c) at least one water-soluble formate. More preferably, the water-soluble polymer is a copolymer of (i) at least one non-acidic ethylenically unsaturated polar monomer, and (ii) at least one polymerizable ethylenically unsaturated ester. The gelling agent is preferably a polyalkyleneimine, polyfunctional aliphatic amine, an aralkylamine, and a heteroaralkylamine. The preferred water-soluble formate is selected from the group consisting of ammonium formate, lithium formate, sodium formate, potassium formate, rubidium formate, cesium formate, and francium formate. Water is used to make an aqueous composition prior to use in a subterranean formation. The methods of this invention for reducing the permeability of a subterranean zone are comprised of the steps of introducing an aqueous composition according to the invention into a subterranean zone, and then allowing the aqueous composition to form a cross-linked gel in the zone. Preferably, the method includes the step of subsequently producing hydrocarbons from the subterranean formation.

U.S. Pat. No. 7,091,160 to Bach Dao et al., entitled "Methods and Compositions for Reducing Subterranean Formation Permeabilities," issued Aug. 15, 2006, and assigned to Halliburton Energy Services, Inc., which is incorporated herein by reference in its entirety, discloses methods and compositions for reducing the permeabilities of subterranean formations or zones are provided. The methods are comprised of introducing an aqueous composition into the formation or zone comprised of water, a water soluble organic polymer, an organic gelling agent for cross-linking the organic polymer and a gel retarder comprised of a chemical compound (e.g., polysuccinimide or polyaspartic acid) that hydrolyzes or thermolyzes to produce one or more acids in the composition and then allowing the aqueous composition to form a cross-linked gel in the formation or zone.

U.S. Pat. No. 7,128,148 to Larry S. Eoff and Michael J. Szymanski, entitled "Well Treatment Fluid and Methods for Blocking Permeability of a Subterranean Zone," issued Oct. 31, 2006, and assigned to Halliburton Energy Services, Inc., which is incorporated herein by reference in its entirety, discloses a well treatment fluid for use in a well, the well treatment fluid comprising water, a water-soluble polymer comprising at least one unit of vinyl amine, and an organic compound that is crosslinked with the polymer. It also discloses a method of treating a subterranean formation penetrated by a wellbore, the method comprising the steps of: (a) forming a treatment fluid comprising water, a water-soluble polymer comprising at least one unit of vinyl amine, and an organic compound that is crosslinked with the polymer; and (b) introducing the treatment fluid through the wellbore and into contact with the formation.

U.S. Pat. No. 7,287,587 to B. Raghava Reddy, Larry S. Eoff, Eldon D. Dairymple, and Julio Vasquez, entitled "Crosslinkable Polymer Compositions and Associated Methods," issued Oct. 30, 2007, and assigned to Halliburton Energy Services, Inc., which is incorporated herein by reference in its entirety, discloses crosslinkable polymer compositions comprising an aqueous fluid; a water-soluble polymer comprising carbonyl groups; an organic crosslinking agent capable of crosslinking the water-soluble polymer comprising carbonyl groups; and a water-soluble carbonate retarder. Methods comprising: providing a crosslinkable polymer composition; introducing the crosslinkable polymer composition into a portion of a subterranean formation; and allowing the crosslinkable polymer composition to form a crosslinked gel in the portion of the subterranean formation.

Halliburton Energy Services, Inc. has employed a crosslinkable polymer system of a copolymer of acrylamide and t-butyl acrylate, where the crosslinking agent is polyethylene imine. These materials are commercially available from Halliburton Energy Services, Inc. as part of the $H_2$Zero™ conformance control service. The $H_2$Zero™ service employs a combination of HZ-10™ polymer and HZ-20™ crosslinker. HZ-10™ polymer is a low molecular weight polymer consisting of polyacrylamide and an acrylate ester. More particularly, HZ-10™ polymer is a co-polymer of acrylamide and t-butyl acrylate ("PAtBA"). The HZ-20™ crosslinker is a polyethyleneimine (which is not chelated). The $H_2$Zero™ service for conformance control includes mixing the HZ-10 with the HZ-20™ crosslinker and injecting the fluid mixture into a well. The relative amounts of HZ-10 and HZ-20™ crosslinker to be used in the preparation of $H_2$Zero™ can be adjusted to provide gelling within a specified time frame (within certain limits) based on reaction conditions such as temperature and pH. For example, the amount of HZ-20™ crosslinker necessary for gelling is inversely proportional to temperature wherein higher amounts of HZ-20™ crosslinker are required at lower temperatures to effect formation of a viscous gel. Adjustment of the $H_2$Zero™ conformance control service to provide optimum gelling time (within certain limits) as a function of temperature and/or pH is known to one of ordinary skill in the art.

More particularly, it is well known that the gelation time of the HZ-10™ polymer and HZ-20™ crosslinker decreases with increasing temperature. It is also believed that a pH of equal to or greater than 10 was helpful to increase the gelation time.

Although the above-described water-soluble polymer systems crosslinked with organic crosslinkers are generally believed to be thermally stable, for example, it is believed the crosslinked gel of the $H_2$Zero™ service is stable up to about 400° F. (204° C.). However, the use of the polymer gel system in conformance applications at matrix temperatures close to the gel stability temperature is limited by the inadequately short pump times. When gelling compositions utilizing gelation retarders such as the carbonate salts, as described in U.S. Pat. No. 7,287,587 discussed earlier, are used in field water, rich in divalent ions such as calcium ion and magnesium which contribute to the hardness of water, or sea water divalent and multivalent ions, precipitation of solids, presumably composed of insoluble magnesium and calcium carbonates, and other insoluble salts, are formed upon mixing the components. Formation of such solid precipitates renders injection of fluids into the porosity of formation matrix very difficult or impossible without using high injection pressure with the possibility of such pressures exceeding the fracture pressure of the formation matrix. Thus, there are continuing needs for improved compositions and methods for blocking the permeabilities of subterranean formations or zones using a crosslinkable polymer composition where the crosslinking of the polymer is effectively and simply controlled at high temperatures.

SUMMARY OF THE INVENTION

The present invention provides compositions and methods for use in treating a subterranean formation.

According to one embodiment, the invention provides a treatment fluid for use in a subterranean formation, the treatment fluid comprising: (a) a water-soluble polymer, wherein the water-soluble polymer comprises a polymer of at least one non-acidic ethylenically unsaturated polar monomer; (b) an organic crosslinker comprising amine groups, wherein the organic crosslinker is capable of crosslinking the water-soluble polymer; (c) a Lewis acid; and (d) water; wherein the treatment fluid comprises a crosslinkable polymer composition.

According to another embodiment, the invention provides a method for blocking the permeability of a portion of a subterranean formation penetrated by a wellbore, the method comprising the steps of: (a) selecting the portion of the subterranean formation to be treated; (b) selecting estimated treatment conditions, wherein the estimated treatment conditions comprise temperature over a treatment time; (c) forming a treatment fluid that is a crosslinkable polymer composition comprising: (i) a water-soluble polymer, wherein the water-soluble polymer comprises a polymer of at least one non-acidic ethylenically unsaturated polar monomer; (ii) an organic crosslinker comprising amine groups, wherein the organic crosslinker is capable of crosslinking the water-soluble polymer; (iii) a Lewis acid; and (iv) water; (d) selecting the water-soluble polymer, the crosslinker, the Lewis acid, and the water, and the proportions thereof, such that the gelation time of the treatment fluid is at least 2 hours when tested under the estimated treatment conditions; and (e) injecting the treatment fluid through the wellbore into the portion of the subterranean formation.

As used herein, the words "comprise," "have," "include," and all grammatical variations thereof are each intended to have an open, non-limiting meaning that does not exclude additional elements or steps.

DETAILED DESCRIPTION OF THE INVENTION

As used herein, "subterranean formation" refers to the fundamental unit of lithostratigraphy. A subterranean formation is a body of rock that is sufficiently distinctive and continuous that it can be mapped. In the context of formation evaluation, the term refers to the volume of rock seen by a measurement made through the wellbore, as in a log or a well test. These measurements indicate the physical properties of this volume, such as the property of permeability. As used herein, a "zone" refers to an interval or unit of rock along a wellbore that is differentiated from surrounding rocks on the basis of hydrocarbon content or other features, such as faults or fractures.

As used herein, a "well" includes a wellbore and the near-wellbore region of rock surrounding the wellbore. As may be used herein, "into a well" means and includes into any portion of the well, including into the wellbore of the well or into a near-wellbore region of a subterranean formation along a wellbore.

As used herein, the word "treatment" refers to a treatment for a well or subterranean formation that is adapted to achieve a specific purpose, such as stimulation, isolation, or conformance control, however, the word "treatment" does not necessarily imply any particular purpose. A treatment for a well or subterranean formation typically involves introducing a treatment fluid into a well.

As used herein, a "treatment fluid" refers to a fluid used in a treatment of a well or subterranean formation. A treatment fluid is typically adapted to be used to achieve a specific treatment purpose, such as stimulation, isolation, or conformance control, however, the word "treatment" in the term "treatment fluid" does not necessarily imply any particular action by the fluid. As used herein, a "treatment fluid" means the specific composition of a fluid at or before the time the fluid is introduced into a wellbore.

As used herein, a "fluid" refers to an amorphous substance having a continuous phase that tends to flow and to conform to the outline of its container when tested at a temperature of 77° F. (25° C.) and a pressure of 1 atmosphere. A fluid can be homogeneous or heterogeneous. A homogeneous fluid consists of a single fluid phase with uniform properties throughout. A heterogeneous fluid consists of at least one fluid phase and at least one other phase, which can be another fluid or a different phase, wherein the other phase has different properties. Examples of a homogeneous fluid include water, oil, or a solution of one or more dissolved chemicals. An example of a heterogeneous fluid is a dispersion. A dispersion is system in which one phase is dispersed in another phase. An example of a dispersion is a suspension of solid particles in a liquid phase. Another example of a dispersion is an emulsion. Further, a fluid can include an undissolved gas, which undissolved gas can be used, for example, for foaming the fluid. An aqueous fluid is a fluid that is either a homogeneous aqueous solution or a heterogeneous fluid wherein the continuous phase is an aqueous solution. An aqueous solution is a solution in which water is the solvent.

Preferably, the treatment fluid according to the invention is a crosslinkable polymer composition. As used herein, a "crosslinkable polymer composition" refers to a composition that under the appropriate conditions (e.g., mixing, time, and temperature) forms a crosslinked gel. As used herein, a "crosslinked gel" refers to a semi-rigid, jelly-like mass formed when a polymer and crosslinking agent combine through a crosslinking reaction.

After placing in a portion of a subterranean formation under sufficient conditions for crosslinking, the crosslinkable polymer composition is expected to produce a crosslinked gel therein, which can at least partially block the flow of water and other fluid through the portion of the subterranean formation. The crosslinkable polymer composition tends to flow into any fractures and high permeability streaks in the subterranean formation. After gelling in such portions of the subterranean formation, the crosslinked gel at least partially blocks fluid flow and directs fluid flow around such fractures or high permeability streaks in the formation and instead through lower permeability portions of the formation. The basic function of the crosslinked gel is to physically fill and block the permeability of a portion of a subterranean formation.

This blocking action of a crosslinked gel is in contrast to the action of a relative permeability modifier, which is a chemical that attaches to adsorption sites on surfaces within the porosity of a subterranean formation and reduces the water permeability thereof without substantially reducing the hydrocarbon permeability thereof. The primary functionality of a relative permeability modifier is to modify the polarity characteristics of the surfaces of the rock within the formation, which tends to favor the relative flow of either water or oil through the formation.

The present invention can be particularly directed to crosslinkable polymer compositions and associated methods that form a crosslinked gel for physically blocking the permeability of a portion of a subterranean formation.

It is important, however, that a crosslinkable polymer composition does not begin to build viscosity before it is placed into the desired portion of a subterranean formation. If it builds viscosity too quickly, this would interfere with pumping and placement of the crosslinkable polymer composition into the formation.

As used herein, the "gelation time" refers to the time a crosslinkable polymer composition under particular conditions takes to begin building viscosity. The gelation time can vary widely depending on a number of factors, including, for example, the nature of the crosslinkable composition and the nature of conditions the crosslinkable polymer composition is subjected to. The nature of the crosslinkable composition includes, for example, the nature of the polymer, the nature of the crosslinking agent, the nature of any catalyst, the nature of the fluid, the concentrations of the various components in the fluid, and the pH if the composition is an aqueous solution. The nature of the conditions include, for example, any shear conditions, pressure conditions, and the temperature conditions from the time of forming the crosslinkable polymer composition to at least the time of placement in a subterranean formation. Regarding temperature conditions, the general rule, of course, is that the higher the temperature, the faster the rate of a chemical reaction, including, for example, a crosslinking reaction. Therefore, the higher the temperature conditions, the shorter the gelation time for a particular crosslinkable polymer composition under otherwise identical conditions.

Gelation time can be determined, for example, with a dynamic coaxial cylinder, controlled shear rate rheometer that allows viscosity measurements under pressure at elevated temperatures over time. An example of such a rheometer is a High-Pressure PVS Rheometer (commercially available from Brookfield Engineering Laboratories Inc., Middleboro, Mass.). Plotting such measurements of viscosity versus time, the gelation time is determined at the inflection point of the curve. A description of gel time measurement methods is given in U.S. Pat. No. 6,176,315, which is incorporated herein by reference.

The desired gelation time for a crosslinkable polymer composition varies depending on the specific treatment application in a specific well. For example, for treating wells of considerable depth, a longer gelation time may be required to allow the crosslinkable composition to be pumped to a desired location in a subterranean formation before the composition forms a crosslinked gel. In addition, a wide range of temperature conditions can be encountered in particular applications, which present challenges to the use of crosslinkable polymer compositions and associated methods. For example, if the bottomhole temperature of the subterranean formation is sufficiently high, the crosslinkable polymer composition gelation time may be too short to allow time for proper placement of the composition. As used herein, the bottomhole temperature ("BHT") is the downhole temperature measured or calculated at a point of interest, such as a portion of a subterranean formation to be treated. The BHT, without reference to circulating or static conditions, is typically associated with producing conditions. The gelation time of a particular crosslinkable polymer composition can be effected by other conditions to which it is subjected, such as pressure and shear rate during pumping and placement.

According to the invention, the composition of a crosslinkable polymer composition is adapted such that the gelation time under the estimated treatment conditions over a treatment time is not too short for a desired treatment purpose. As used herein, the estimated treatment conditions include at least an estimated temperature profile for the treatment fluid over the treatment time. The estimated treatment conditions can additionally include an estimated shear rate and estimated pressure profile over the course of the treatment time. It should be understood that the any of the estimated temperature, shear rate, and pressure profiles over the treatment time can be constant, ramped, or otherwise varied over the treatment time. As used herein, a "treatment time" is the time under the treatment conditions measured from the time of formation of the crosslinkable polymer composition through the time the crosslinkable polymer composition becomes a crosslinked gel. The gelation time under the estimated treatment condition should be at least sufficient for desired placement of the crosslinkable polymer composition into a subterranean formation before the gelation time, whereby the crosslinkable polymer composition can be expected to be placed as desired before it becomes a crosslinked gel.

For example, in a conformance control treatment using a treatment fluid comprising a crosslinkable polymer composition, the treatment fluid is pumped down a wellbore and into the matrix of a subterranean formation. The amount of the treatment fluid to be pumped depends upon several factors, including the length of the formation to be treated along the wellbore and the desired depth of penetration outward from the wellbore. This depth of penetration may vary, but is typically at least 2 feet away from the wellbore and may be as much as 25 feet away from the wellbore. It is typically desired to place the entire amount of the treatment fluid into the formation of interest before the crosslinkable polymer composition begins to build viscosity. Therefore, there is a finite amount of pumping time to place the treatment fluid.

One factor involved in determining this pump time is the depth of the zone of interest of a subterranean formation to be treated. In addition, injectivity tests can be performed on the zone of interest, typically using brine solutions, which can indicate the rate at which fluids can be pumped into the formation. Therefore, the amount of time required to pump the treatment fluid into place in a subterranean formation can be determined.

In addition to the pump time, the estimated treatment conditions for a treatment can be determined by a person of skill in the art, including based on the depth, bottomhole temperature, and injectivity profile of the subterranean formation. As mentioned above, the estimated treatment conditions include at least an estimated temperature profile for the treatment fluid over the course of the treatment time. The estimated treatment conditions can additionally include an estimated shear rate profile for the injection of the treatment fluid over the course of the treatment time and an estimated pressure profile for the injection of the treatment fluid over the course of the treatment time. As a safety factor, the estimated treatment conditions are usually estimated to be more extreme than the actual injection treatment conditions. For example, instead of estimating a temperature profile of increasing temperature for the treatment fluid over the course of the treatment time, the estimated treatment conditions can assume that the temperature is constant at the bottomhole temperature of the formation. Similarly, the shear rate may actually be zero after placement of the treatment fluid in the formation, however, the estimated treatment conditions may assume a constant shear rate. These will provide a margin against premature gelation of treatment using a crosslinkable polymer composition.

According to current technology, the pump time for such a treatment fluid is rarely determined to be less than about 1 hour. Accordingly, the required gelation time in accordance with the estimated treatment conditions is usually determined to be at least 1 hour. In addition, at least 1 hour is preferably added to the required gelation time as a safety factor against interruption or other difficulty during pumping, for example, in case the pumping operation is interrupted due to pump breakdown or other mechanical failures. Therefore, it is often desirable to provide a gelation time under the estimated treatment conditions that is at least 2 hours. On the other hand, it is desirable to provide a gelation time that is not too long, either. Accordingly, the gelation time should be less than 100 hours under the estimated treatment conditions. A preferred gelation time under the estimated treatment conditions for a well treatment on a subterranean formation is usually in the range of about 2 hours to about 4 hours.

To help increase the gelation time of a crosslinkable polymer composition under the applicable conditions, a pre-cool step can be employed, which involved injecting a cooled fluid into the wellbore to lower the temperature profile of the wellbore and formation just prior to introducing a treatment fluid comprising a crosslinkable polymer composition. In an embodiment of the method of the invention, it will sometimes be possible to reduce the volume of any pre-cool stage and consequently the time and expense required to conduct a pre-cool step. In any case, as the treatment fluid is pumped downhole and permeates into a subterranean formation, it is heated up by the higher temperature of the formation and eventually reaches equilibrium with the natural downhole temperature of the formation.

According to the methods of the present invention, the permeability of the portion of the subterranean formation to be treated is preferably high, but the methods can be useful even if the permeability is as low as about 1 mD.

1. TREATMENT FLUIDS

As mentioned, according to one embodiment, the invention provides a treatment fluid for use in a subterranean formation, the treatment fluid comprising: (a) a water-soluble polymer, wherein the water-soluble polymer comprises a polymer of at least one non-acidic ethylenically unsaturated polar monomer; (b) an organic crosslinker comprising amine groups, wherein the organic crosslinker is capable of crosslinking the water-soluble polymer; (c) a Lewis acid; and (d) water; wherein the treatment fluid comprises a crosslinkable polymer composition.

Unless otherwise specified, any doubt regarding whether units are in U.S. or Imperial units, in the few cases where there is any difference, U.S. units are intended herein. For example, "gal/Mgal" means U.S. gallons per thousand U.S. gallons. In addition, unless otherwise specified, any percentage means by weight.

A. Water-Soluble Polymer

A water-soluble polymer useful in the compositions of this invention is formed from at least one non-acidic ethylenically unsaturated polar monomer. More preferably, the polymer is a copolymer of at least one non-acidic ethylenically unsaturated polar monomer and at least one ethylenically unsaturated ester.

(i) Non-Acidic Ethylenically Unsaturated Polar Monomer

The non-acidic ethylenically unsaturated polar monomer may be derived from an unsaturated carboxylic acid wherein the unsaturated group is vinyl or alpha methyl vinyl. The polar monomer formed from the acid is non-acidic and is preferably a primary, secondary, or tertiary amide of the unsaturated carboxylic acid. The amide can be derived from ammonia or a primary or secondary alkylamine, e.g., an alkyl amine having from 1 to 10 carbon atoms which may also be substituted by at least one hydroxyl group. That is, the amide of the acid can be an alkylol amide such as ethanolamide. Examples of suitable non-acidic ethylenically unsaturated polar monomers are acrylamide, methacrylamide, and acrylic ethanol amide. The non-acidic ethylenically unsaturated polar monomer may also be a vinyl heterocyclic compound with at least an oxygen, sulfur, or nitrogen atom in a ring with 3 to 8 carbon atoms, such as one with at least one carbonyl group in the ring, e.g., N-vinyl pyrrolidone, N-vinyl caprolactam, or a vinyl pyridine.

(ii) Copolymer with Ethylenically Unsaturated Ester

The presence of the ester moiety in polymers for use in the invention is expected to be unnecessary since the gelation retarder delays the gelation time and thus enables the copolymer to be premixed with crosslinker before being pumped downhole. Nevertheless, the ester moiety can provide additional control of the gelation time and may be helpful. If the ester moiety is included in the copolymer, it is preferred that the ester group be such as to provide steric hindrance and, for this purpose, bulky ester groups such as t-butyl, for example, are preferred. The precise delay in cross-linking and gelation caused by the ester group will vary from copolymer to copolymer, as will be clear to those skilled in the art. Some experimental trial may, therefore, be necessary to determine the optimum with any particular copolymer. The nature and amount of the ester will be such as to provide a delay in the gelation time (compared to a homopolymer omitting any ester component), sufficient, for example, to enable a premix to be pumped into a formation without premature gelling.

The ethylenically unsaturated esters which can be used with the non-acidic ethylenically unsaturated polar monomer described above to form a copolymer can be formed from an ethylenically unsaturated carboxylic acid and a hydroxyl compound. The ethylenically unsaturated group is preferably in the alpha to beta or the beta to gamma position relative to the carboxyl group or may be further distant.

Preferred ethylenically unsaturated carboxylic acids for use in forming the ethylenically unsaturated esters have in the range of from 3 to 20 carbon atoms. Examples of these acids are acrylic acid, methacrylic acid, crotonic acid, and cinnamic acids.

The hydroxyl compound for use in forming the ethylenically unsaturated esters is preferably an alcohol of the formula ROH, where R is a hydrocarbyl group. Preferred hydrocarbyl groups are alkyl groups having from 1 to 30 carbon atoms, alkenyl groups having from 2 to 20 carbon atoms, cycloalkyl groups having from 5 to 8 carbon atoms, aryl groups such as aromatic hydrocarbyl groups having from 6 to 20 carbon atoms, and arylalkyl groups having from 7 to 24 carbon atoms. Specific examples of R groups are methyl, ethyl, propyl, butyl, amyl, hexyl, octyl, 2-ethylhexyl and decyl (including all stereoisomers), allyl, cyclohexyl, palmityl, stearyl, phenyl, and benzyl.

The R group of the hydroxyl compound may also be a hydrocarbyl group substituted by at least one, e.g., from 1 to 3 substituents, such as hydroxyl, ether, and thioether groups. Electron donating group substituents are preferred. Ether substituents are also preferred, especially alkoxy, aryloxy, and arylalkoxy in which the alkyl, aryl, and arylalkyl groups may be as described above. Preferably, the substituent is on the same carbon atom of the R group as is bonded to the hydroxyl group in the hydroxyl compound with alkoxymethyl and arylalkyloxy methyl groups being preferred.

The R group of the hydroxyl compound may also comprise a heterocyclic group either for bonding directly to the hydroxyl group of ROH or separated therefrom by an alkylene group having 1 to 4 carbon atoms such as methylene. Thus, the R group may be a saturated or unsaturated heterocyclic or heterocyclic alkylene group, e.g., having 3 to 8 carbon atoms and at least one or two ring heteroatoms selected from oxygen, nitrogen, and sulfur. Examples of such groups are furyl, tetrahydrofuryl, furfuryl and tetrahydrofurfuryl, pyranyl, and tetrahydropyranyl.

The hydroxyl compound may be a primary, secondary, iso, or tertiary compound, preferably with a tertiary carbon atom bonded to the hydroxyl group, e.g., tert-butyl and trityl. Preferred R groups are tert-butyl, trityl, methoxymethyl, benzyloxymethyl, and tetrahydropyranyl. Other less preferred R groups include stearyl, isopropyl, ethyl, and methyl. The most preferred ester is t-butyl ester.

The ester is preferably substantially neutral as a fully esterified derivative of an acid, i.e., complete ester, rather than a partial ester with free acid groups.

The copolymer can contain from about 0.01 to 50%, e.g. 0.1 to 40% or 1 to 30%, especially 5 to 15% (by mole) of structural units from said ester(s) and 99.99 to 50% e.g. 99.9 to 60% or 99 to 70% or 95 to 85% (by mole) of structural units from said polar monomer(s) (please see U.S. Pat. No. 6,192,986, which is incorporated herein by reference in its entirety). More preferably, the polar monomer is present in the copolymer in an amount of about 85 to about 95 mole percent with the ester monomer being present in an amount of from about 5 to about 15 mole percent. The copolymer may be a block or non-block copolymer, a regular or random copolymer, or a graft copolymer whereby the ester units are grafted onto a polymerized polar monomer, e.g., the ester grafted onto polyacrylamide.

In the more preferred compositions of the invention, the copolymer is formed from at least one polar monomer, preferably from 1 to 3 monomers, and at least one, preferably from 1 to 3, esters, and comprises structural units derived from said monomer(s) and ester(s). Most preferably, the copolymer consists essentially of said structural units.

The copolymer can be produced by conventional methods for copolymerizing ethylenically unsaturated monomers in solution, emulsion, or suspension.

(iii) Other Monomers

In order to slow down the cross-linking of the crosslinkable polymer composition and increase its gel strength after it is cross-linked, a copolymer, a terpolymer or tetrapolymer formed from the above-described polar monomer, with other monomers such as 2-acrylamido-2methylpropane sulfonic (AMPS®) acid and its salts, alkali and alkaline earth metal salts of acrylic acid, alkacrylic acids (for example, methacrylic acid), styrene sulfonic acid, N-vinylpyrrolidone in addition to or in place of the above described ester can be substituted for or combined with the above-described copolymer. The terpolymer can contain from about 50 to about 98.9 mole percent of the polar monomer, from about 0.01 to about 50 mole percent of the ester, and from about 1 to about 40 mole percent of the AMPS® or N-vinylpyrrolidone monomer. The tetrapolymer can contain from about 50 to about 97.9 mole percent of the polar monomer, from about 0.01 to about 50 mole percent of the ester, from about 1 to about 20 mole percent of AMPS®, and from about 1 to about 20 mole percent of N-vinylpyrrolidone. The terpolymer or tetrapolymer can be a block or non-block polymer, a regular or random polymer, or a graft polymer. In addition, the solubility, molecular weight, viscosity, production, and other properties of the terpolymer or tetrapolymer should generally be as described above for the copolymer. Examples of such polymers are provided in U.S. Pat. No. 6,176,315, which is incorporated by reference in its entirety.

(iv) Water Solubility of Polymer

The water-soluble polymer is soluble in water to the extent of at least 10 grams per liter in deionized water at 25° C. More preferably, the water-soluble polymer is also soluble to the extent of at least 10 grams per liter in an aqueous sodium chloride solution of 32 grams sodium chloride per liter of deionized water at 25° C. If desired, the water-soluble polymer can be mixed with a surfactant to facilitate its solubility in the water or salt solution utilized. The water-soluble polymer can have an average molecular weight in the range of from about 50,000 to 20,000,000, most preferably from about 100,000 to about 500,000. A water-soluble polymer having an average molecular weight of about 50,000 has a viscosity when dissolved in distilled water in the amount of about 3.6% by weight of the solution at 19° C. of from about 10 to about 500 centipoise. Preferably, the polymer is shear thinnable, whereby the viscosity reduces by at least 10% on increasing shear rate by 10%.

B. Organic Crosslinker

As used herein, a "crosslinker" is a chemical that reacts with the water-soluble polymer to chemically link by covalent bonds the polymer molecules, which helps increase the viscosity of the polymer in solution. As used herein, "organic crosslinker" means that the crosslinker forms covalent bonds between water-soluble polymer and the crosslinker, not ionic bonds. According to the invention, the organic crosslinker for the water-soluble polymer is an organic compound comprising amine groups.

The crosslinker is water soluble in water to the extent of at least 10 grams per liter in deionized water at 25° C. More preferably, the crosslinker is also soluble to the extent of at least 10 grams per liter in an aqueous sodium chloride solution of 32 grams sodium chloride per liter deionized water at 25° C.

Preferably, the crosslinker comprising amine groups is a polymer. More preferably, the organic crosslinker suitable for use in accordance with this invention is selected from the group consisting of a polyalkyleneimine, polyfunctional aliphatic amine, an aralkylamine, a heteroaralkylamine, polyvinylamine and poly(vinylamine-co-vinylalcohol). Additional details concerning these polymers and their preparation are disclosed in U.S. Pat. No. 3,491,049 and U.S. Pat. No. 7,128,148, the specifications of which are incorporated herein by reference in its entirety. The preferred polyalkylenepolyamines are the polymeric condensates of lower molecular weight polyalkylenepolyamines and a vicinal dihaloalkane. The polyalkyleneimines are best illustrated by polymerized ethyleneimines or propyleneimine. The polyalkylenepolyamines are exemplified by polyethylene and polypropylenepolyamines. Other organic crosslinkers which can be used include water-soluble polyfunctional aliphatic amines, aralkylamines, and heteroaralkylamines optionally containing other hetero atoms. Of these, polyethylene imine is most preferred.

Although less preferred, other organic crosslinkers that are expected to be suitable for use in accordance with this invention are metal-ion chelated water-soluble polymers capable of cross-linking the water-soluble polymer. The organic crosslinkers may be chelated as described in U.S. Pat. No. 6,196,317, the specification of which is incorporated herein by reference in its entirety. Particularly suitable such water-soluble polymeric crosslinkers are chelated polyethylene imines and polypropylene imines. Of these, chelated polyethylene imine is the most preferred. As mentioned, by chelating with a metal ion, the crosslinker is prevented from cross-linking the copolymer prematurely at high temperatures. That is, the polyalkylene imine utilized is chelated with a metal ion selected from the group consisting of zirconium ion, cobalt ion, nickel ion, ferric ion, titanium IV ion, and copper ion. Of these, zirconium ion is the most preferred.

C. Lewis Acid as Gelation Retarder

As used herein, a chemical compound is referred to as a "Lewis acid" if it is capable of accepting a pair of electrons from an electron pair donor and does not have a tendency to donate a proton, unlike Bronsted acids.

In an embodiment, the Lewis acid is not a Bronsted acid. A Bronsted acid is an acid which functions as an acid by donating a proton to an acceptor molecule (called a Bronsted base), and a Bronsted base is a base which accepts a proton from a proton donor molecule (called a Bronsted acid).

Compounds which function as Lewis acids are characterized by the presence of either electron deficient central atoms or central atoms with high formal positive charge in neutral molecules or by cationic metal ions with high positive charge capable of accepting at least a pair of electrons from electron pair donors in salts.

Examples of neutral compounds which function as Lewis due to the presence of electron deficient central atoms include boric acid and boron trifluoride in which the trivalent boron atom is two electron deficient to reach the stable octet electron configuration. Examples of neutral compounds which contain central atoms which contain high formal positive charges include, but not limited to, sulfur trioxide, sulfur dioxide, antimony pentachloride, aluminum hydroxide acetate, aluminum chloride, and aluminum bromide. Examples of salts containing metal ions with high positive charges (for example, +2 to +4) include aluminum (III) sulfate, potassium aluminum (III) sulfate belonging to the general class of chemicals known as alums, and tin (IV) tetrachloride and tin (II) chloride. The Roman numerals in the names of compounds listed represent the positive charges on the metal ion in the salt. Although transition metal (Groups 3-12 in the Periodic Table, alternately referred to as d-block metals) salts, such as those of iron (III), iron (II), zirconium (IV), titanium (IV), nickel (II) and copper (II) and the like are also capable of functioning as Lewis acids by accepting electron pairs, such Lewis acids materials containing transition metal ions are excluded from this invention. Only salts containing main group metal ions (Groups 13-16, alternately labeled as Groups III-VI of Periodic Table, alternately referred to as p-block metals) constitute the instant invention. Of the different Lewis acids suitable for the invention, neutral trivalent boron compounds and neutral aluminum compounds and aluminum salts are preferred. Of the neutral trivalent boron compounds, boric acid is most preferred. As used herein, boric acid is considered to not be a Bronsted acid. Boric acid acts as a Lewis acid and accepts an electron pair from the electron pair donating molecules, for example an amine or ammonia. Of aluminum salts, aluminum sulfate is most preferred. It is expected that the Lewis acid used according to the invention can be a single Lewis acid or it can be any combination of two or more Lewis acids.

According to a most preferred embodiment, the Lewis acid is water soluble. These Lewis acids have exhibited the ability to delay the gelation time of the crosslinkable polymer composition (for example, $H_2Zero$™) comprising water-soluble polymers with amine-containing organic crosslinkers, wherein the water-soluble polymers comprise a polymer of at least one non-acidic ethylenically unsaturated polar monomer.

It is expected that this ability of a Lewis acid to delay the cross-linking by amine-containing cross-linkers will work with crosslinkable polymer compositions comprising other water-soluble polymers which can be crosslinked by amine-containing organic crosslinkers, wherein the water-soluble polymers comprise a polymer of at least one non-acidic ethylenically unsaturated polar monomer. Without being limited by theory, it is believed that the Lewis acids bind to electron pair donating nitrogens of the amine containing cross-linkers thus making the nitrogens of the cross-linker less available for cross-linking, or make them available for cross-linking only at higher temperatures.

It is expected that the weak organic acid used according to the invention can be a single Lewis acid or it can be any combination of two or more Lewis acids.

As used herein, a "gelation retarder" is a chemical that when in a sufficient concentration delays the gelation time of a crosslinkable polymer composition relative to a similar composition without such a high concentration of the chemical. A gelation retarder in such concentration does not prevent the formation of a crosslinked gel. It is believed that a Lewis acid functions as a gelation retarder when present in the composition at much higher concentrations than it would otherwise be naturally occurring in the water or if added to such a composition for other purposes. For example, the Lewis acid should be present in a higher concentration than would be used for catalytic purposes. Catalytic concentrations can be defined as less than 10 mole % based on the monomer unit of the crosslinker.

The Lewis acid as gelation retarder is present in at least an effective concentration in the crosslinkable polymer composition such that the gelation time is at least 1 hour when tested under the estimated treatment conditions for a treatment of a subterranean formation. More preferably, an otherwise similar treatment fluid except without the effective concentration of the gelation retarder would not have the desired gelation time of at least 1 hour under the same estimated treatment conditions. A preferred gelation time under the estimated treatment conditions for a well treatment on a subterranean formation is usually in the range of about 2 hours to about 4 hours. Accordingly, most preferably, an otherwise similar treatment fluid except without the effective concentration of the gelation retarder would not have the desired gelation time of at least 2 hours under the same estimated treatment conditions.

Preferably, the Lewis acid is water soluble. It is believed that to be effective as a gelation retarder, the Lewis acid would be required in a concentration of at least about 20 mole % to about 70 mole % of the nitrogens, or the nitrogen containing monomers in the case of polymeric crosslinkers, in the amine containing cross-linker. As an example, if polyethyleneimine is used as the organic, amine containing cross-linker, the amount of boric acid needed would be in the range of 12% to 100% by weight of poyethyleneimine for the boric acid to be equivalent to the 20 mole % to 70% mole % of the nitrogens in polyethyleneimine. Preferably, the Lewis acid is present in a concentration of at least 25 lb/Mgal (about 0.3% by weight) of water, however, the concentration of the Lewis acid in the water of the treatment fluid preferably does not exceed its solubility in the water. It is important that the Lewis acid amounts used are not in catalytic amounts, which as used herein means less than 10 mole % based on the amine groups of the cross-linker, because such small amounts accelerate the cross-linking reaction and shorten the gelation time as shown for boric acid and polyethyleneimine in U.S. Pat. No. 6,176,315. It is now unexpectedly found that Lewis acids when used in quantities significantly larger than catalytic amounts, the cross-linking reaction is slowed down and the cross-linking time is extended.

Preferably, a Lewis acid is selected that is generally considered to be biodegradable, biocompatible and/or not a long-term environmental pollutant.

D. Water

For downhole use in a well, the treatment fluid of the invention contains water in which the water-soluble polymer, the crosslinker, and the Lewis acid are dissolved. Any convenient source of water can be used, so long as it does not contain components that would adversely effect the compositions of the invention, such as by causing precipitation. For example, the water for use in the treatment fluid can be fresh water, seawater, natural brine, formulated brine, 2% KCl solution, and any mixture thereof. Formulated brine is manufactured by dissolving one or more soluble salts in water, natural brine, or seawater. Representative soluble salts are the chloride, bromide, acetate and formate salts of potassium, sodium, calcium, magnesium and zinc.

Preferably, the treatment fluid is made up just before use by mixing at least the polymer, the crosslinker, the Lewis acid, and the water, and then injecting the treatment fluid into the formation.

E. Other Additives

The well treatment fluid of this invention generally will contain materials well known in the art to provide various characteristics of properties to the fluid. Thus, the well treatment fluid can contain one or more viscosifiers or suspending agents in addition to the water-soluble polymer, surfactants, oxygen scavengers, alcohols, scale inhibitors, corrosion inhibitors, weighting agents, soluble salts, biocides, fungicides, fluid loss control additives such as silica flour, seepage loss control additives, bridging agents, deflocculants, lubricity additives, shale control additives, pH control additives, and other additives as desired.

F. Preferred Treatment Fluids

More preferred compositions of this invention are comprised of combinations of the more preferred examples of a water-soluble polymer, an organic crosslinker, a Lewis acid, and water.

For example, in the more preferred compositions, (a) the water-soluble polymer is preferably a copolymer of: (i) at least one non-acidic ethylenically unsaturated polar monomer, and (ii) at least one polymerizable ethylenically unsaturated ester. More preferably still, the non-acidic ethylenically unsaturated polar monomer in the polymer is preferably an amide of an ethylenically unsaturated carboxylic acid, most preferably acrylamide. The ethylenically unsaturated ester in the copolymer is preferably formed of a hydroxyl compound and an ethylenically unsaturated carboxylic acid selected from the group of acrylic acid, methacrylic acid, crotonic acid, and cinnamic acid. The hydroxyl compound is preferably an alcohol having the formula ROH wherein R is a group selected from alkyl, alkenyl, cycloalkyl, aryl, arylalkyl, or an aromatic or heterocyclic group substituted with one or more groups selected from hydroxyl, ether, and thioether groups. Most preferably, the ethylenically unsaturated ester monomer is t-butyl acrylate. Most preferably, the water-soluble polymer is poly(acrylamide/t-butyl acrylate).

Preferably, the organic crosslinker comprising amine groups is selected from the group consisting of a polyalkyleneimine, polyfunctional aliphatic amine, an aralkylamine, and a heteroaralkylamine. Most preferably, the organic crosslinker is polyethylene imine. Preferably, the treatment fluid does not include a crosslinker that forms ionic bonds with the water-soluble polymer.

The concentration of water-soluble polymer in the aqueous composition is preferably from 500 to 100,000 ppm, in particular 500 to 10,000 ppm for polymers of molecular weight of at least 1 million, and from 10,000 to 100,000 ppm for polymers of molecular weight 50,000 to 1 million. Preferably, the concentration of the crosslinker in the aqueous composition is from 10 to 50,000 ppm, especially 10 to 1,000 ppm and 1,000 to 50,000 ppm, respectively, for the high and low molecular weight copolymers.

The presently preferred compositions of this invention are comprised of a copolymer of acrylamide and t-butyl acrylate present in an amount of about 3% to about 10% by weight of the water therein and an organic crosslinker comprised of polyethylene imine present in the composition in an amount of about 0.5% to about 4% by weight of water therein. For example, a preferred composition of this invention can be comprised of a copolymer of acrylamide and t-butyl acrylate present in an amount of about 7% by weight of the water therein and an organic crosslinker comprised of polyethylene imine present in the composition in an amount of about 1% by weight of water therein.

According to an embodiment, the crosslinkable polymer composition preferably has a gelation time of at least about 2 hours when tested at a constant shear rate of 10 1/s, a constant pressure of 270 psi, and a constant temperature of 250° F. (121° C.). Preferably, the crosslinkable polymer composition has a gelation time of less than 100 hours when tested at a constant shear rate of 10 1/s, a constant pressure of 270 psi, and a constant temperature of 250° F. (121° C.).

It is to be understood, of course, that without undo experimentation, further examples and even more preferred compositions may be determined by the ordinary routineer with ordinary experimentation within the scope and spirit of the invention as defined herein.

2. PREFERRED METHODS

In general, the methods of this invention for blocking the permeability of a portion of a subterranean formation are comprised of the steps of introducing a treatment fluid comprising a crosslinkable polymer composition according to the invention into the portion of the subterranean formation, and then allowing the crosslinkable polymer composition to form a crosslinked gel. Forming the crosslinked gel in the subterranean formation reduces or completely blocks the permeability, whereby fluid flow through that portion is reduced or terminated.

More particularly, the method for blocking the permeability of a portion of a subterranean formation penetrated by a wellbore, the method comprising the steps of: (a) selecting the portion of the subterranean formation to be treated; (b) selecting estimated treatment conditions, wherein the estimated treatment conditions comprise temperature over a treatment time; (c) forming a treatment fluid that is a crosslinkable polymer composition comprising: (i) a water-soluble polymer, wherein the water-soluble polymer comprises a polymer of at least one non-acidic ethylenically unsaturated polar monomer; (ii) an organic crosslinker comprising amine groups, wherein the organic crosslinker is capable of crosslinking the water-soluble polymer; (iii) a Lewis acid; and (iv) water; (d) selecting the water-soluble polymer, the crosslinker, the Lewis acid, and the water, and the proportions thereof, such that the gelation time of the treatment fluid is at least 1 hour when tested under the estimated treatment conditions; and (e) injecting the treatment fluid through the wellbore into the portion of the subterranean formation. Preferably, the step of injecting is under actual treatment conditions that are within the limits of the estimated treatment conditions. According to a further embodiment, the method further comprises the step of allowing the treatment fluid to gel prior to producing hydrocarbons from or through the subterranean formation.

The bottomhole temperature of the portion of the subterranean formation to be treated can be equal to or greater than 80° F. (27° C.). Preferably, the bottomhole temperature of the portion of the subterranean formation to be treated is equal to or less than 400° F. (204° C.), although higher temperatures may be possible for certain crosslinkable polymer compositions.

More particularly, these treatment fluids are usually made up just before use by mixing the water-soluble polymer, the crosslinker, the gelation retarder, and water, and then injecting the aqueous composition into the formation. The composition is preferably kept at below 122° F. (50° C.), e.g., below 86° F. (30° C.) before use.

The introduction of these compositions into the subterranean formation may, if desired, be preceded by a pre-cooling treatment of the portion of the subterranean formation to be treated, e.g., with cold water to stop premature cross-linking, but preferably the injection process is performed without such a pretreatment.

The aqueous compositions may be injected into a formation via a producing well or via a secondary injection well (for use with a water flood or squeeze technique), for example. The aqueous compositions may simply be injected into the formation, but preferably they are forced into it by pumping.

The well may be shut in for about 1 hour to about 70 hours, for example, to allow the gelling to occur, and then production may be restarted. Preferably, the gelation time of the crosslinkable polymer composition does not exceed about 6 hours under the estimated treatment conditions. Any substantial flowback from the zone can be delayed for at least the expected gelation time under actual downhole conditions after the step of injecting the well treatment fluid into the zone.

The compositions for use in the methods according to the invention have the benefit of a low tendency to crosslinking and gelling in the wellbore (i.e., reduced aggregate build-up) but rapid cross-linking at the high temperatures of the subterranean formation. They are, therefore, less susceptible to process handling problems. According to the more preferred embodiments, the treatment fluids and methods are without the environmental and other problems associated with the use of metal crosslinking agents.

3. EXAMPLES

Halliburton Energy Services, Inc. has employed a crosslinkable polymer system of a copolymer of acrylamide and t-butyl acrylate, where the crosslinking agent is polyethylene imine. These materials are commercially available from Halliburton Energy Services, Inc. as part of the $H_2Zero$™ conformance control service. The $H_2Zero$™ service employs a combination of HZ-10™ polymer and HZ-20™ crosslinker. HZ-10™ polymer is a low molecular weight polymer consisting of polyacrylamide and an acrylate ester. More particularly, HZ-10™ polymer is a co-polymer of acrylamide and t-butyl acrylate ("PAtBA"). The HZ-20™ crosslinker is a polyethyleneimine (which is not chelated). The $H_2Zero$™ service for conformance control includes mixing the HZ-10™ with the HZ-20™ crosslinker and injecting the fluid mixture into a well. Unwanted water intrusion treatment or seal off in oil or gas producing wells can be addressed by placing permanent sealing systems like $H_2Zero$™ into the reservoir. The deeper placement of the sealing polymers is the key point to assure short and long-term success of the water control process.

In high temperature environments, the deeper placement of the sealing HZ-10™ polymer of $H_2Zero$™ service has only been possible using a carbonate salt based retarder system like sodium carbonate buffering agent, which has a high buffered pH for a 1% solution of about pH 10 to about 10.5. Lab testing of the $H_2Zero$™ system using sodium carbonate buffering agent with the field water, in some cases depending on the water source and its hardness, has showed salt precipitation problem due to the carbonate incompatibility or high pH of the final polymer solution. A high pH of greater than about 10 is unfortunately in a range for promoting salt precipitation. Lowering the pH tends to undesirably shorten the gelation time.

A Lewis acid in replacement of the carbonate based salts has been tested. Lab testing showed that a Lewis acid works also as a retarder system for the $H_2Zero$™ service.

Lab testing looking for additional alternatives to replace carbonate salts as gelation retarder has showed that a Lewis acid could work as an effective gelation retarder for the $H_2Zero$™ system at high temperatures.

The retardation effect on gelation time of Lewis acids is evident from the following experimentation. A crosslinkable polymer composition was used consisting of 350 gal/Mgal HZ-10 and 30 gal/Mgal HZ-20 in 2% KCl solution. The composition was tested with either no gel retarder as a control or with Lewis acid materials, namely boric acid and aluminum sulfate under conditions of constant temperature of 190° F. (88° C.), ambient pressure, and static conditions (no shear). Table 1 summarizes the testing results:

TABLE 1

| Gelation Retarder | lb/Mgal | Gelation Time (hrs) @ 190° F. |
|---|---|---|
| None | Not applicable | 7 |
| boric acid | 100 | 11 |
| aluminum sulfate | 75 | >40 |
| aluminum sulfate | 35 | 18 |

A Lewis acid as retarder for the crosslinkable polymer compositions comprising amine containing organic crosslinkers is believed to be a new approach for avoiding problems associated with carbonate or formate salt based retarders.

For comparison, the gelation times for an H$_2$Zero system at such a high temperature without any added retarder is about 7 hours.

Lewis acid solutions have exhibited the ability to delay the cross-linking for an H$_2$Zero™ system, which would otherwise proceed much more quickly under such conditions. In general, it is believed that a Lewis acid in a concentration of at least 20 mole % of the nitrogen atoms of the crosslinker would begin to be effective to delay the gelation time of the crosslinkable polymer compositions comprising organic crosslinkers comprising amine groups (for example, H$_2$Zero™ system). It is expected that these examples of Lewis acid as a gelation retarder for a crosslinkable polymer composition can be extrapolated to be useful with any water-soluble polymer, wherein the water-soluble polymer comprises a polymer of at least one non-acidic ethylenically unsaturated polar monomer and the organic crosslinker comprises amine groups.

4. EXAMPLES ARE ILLUSTRATIVE OF INVENTION

Therefore, the present invention is well adapted to attain the ends and advantages mentioned as well as those that are inherent therein. The particular embodiments disclosed herein are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A treatment fluid for use in a subterranean formation, the treatment fluid comprising:
   (a) a water-soluble polymer, wherein the water-soluble polymer comprises a polymer of at least one non-acidic ethylenically unsaturated polar monomer;
   (b) an organic crosslinker comprising amine groups, wherein the organic crosslinker is capable of crosslinking the water-soluble polymer;
   (c) boric acid, wherein the boric acid is present in a concentration of at least 0.3% by weight (25 lb/Mgal) of the water; and
   (d) water;
   wherein the treatment fluid comprises a crosslinkable polymer composition.

2. The treatment fluid according to claim 1, wherein the non-acidic ethylenically unsaturated polar monomer is acrylamide.

3. The treatment fluid according to claim 1, wherein the water-soluble polymer comprises:
   (i) at least one non-acidic ethylenically unsaturated polar monomer, and
   (ii) at least one polymerizable ethylenically unsaturated ester.

4. The treatment fluid according to claim 1, wherein the polymerizable ethylenically unsaturated ester is t-butyl ester.

5. The treatment fluid according to claim 1, wherein the water-soluble polymer is poly(acrylamide/t-butyl acrylate).

6. The treatment fluid according to claim 1, wherein the water-soluble polymer is soluble in water to an extent of at least 10 g/l when measured in a sodium chloride solution of 32 g/l of sodium chloride in deionized water at 25° C.

7. The treatment fluid according to claim 1, wherein the organic crosslinker is selected from the group consisting of a polyalkyleneimine, a polyfunctional aliphatic amine, an aralkylamine, a heteroaralkylamine, and any combination thereof.

8. The treatment fluid according to claim 1, wherein the organic crosslinker is a polyalkyleneimine.

9. The treatment fluid according to claim 1, wherein the organic crosslinker is polyethyleneimine.

10. A treatment fluid for use in a subterranean formation, wherein the treatment fluid comprises:
    (a) a water-soluble polymer comprising a copolymer of:
       (i) at least one non-acidic ethylenically unsaturated polar monomer, and
       (ii) at least one polymerizable ethylenically unsaturated ester;
    (b) a polyethylene imine capable of cross-linking the water-soluble polymer;
    (c) boric acid, wherein the boric acid is present in a concentration of at least 0.3% by weight (25 lb/Mgal) of the water; and
    (d) water;
    wherein the treatment fluid is a crosslinkable polymer solution.

11. A method for blocking the permeability of a portion of a subterranean formation penetrated by a wellbore, the method comprising the steps of:
    (a) selecting the portion of the subterranean formation to be treated;

(b) selecting estimated treatment conditions, wherein the estimated treatment conditions comprise temperature over a treatment time;
(c) forming a treatment fluid that is a crosslinkable polymer composition comprising:
   (i) a water-soluble polymer, wherein the water-soluble polymer comprises a polymer of at least one non-acidic ethylenically unsaturated polar monomer;
   (ii) an organic crosslinker comprising amine groups, wherein the organic crosslinker is capable of crosslinking the water-soluble polymer;
   (iii) boric acid, wherein the boric acid is present in a concentration of at least 0.3% by weight (25 lb/Mgal) of the water; and
   (iv) water;
(d) selecting the water-soluble polymer, the crosslinker, the boric acid, and the water, and the proportions thereof, such that the gelation time of the treatment fluid is at least 1 hour when tested under the estimated treatment conditions; and
(e) injecting the treatment fluid through the well bore into the portion of the subterranean formation.

12. The method according to claim 11, wherein the step of injecting is under actual treatment conditions that are within the limits of the estimated treatment conditions.

13. The method according to claim 11, further comprising the step of:
allowing the treatment fluid to gel in the formation.

14. The method according to claim 13, further comprises, after the step of allowing, the step of producing hydrocarbons from or through the subterranean formation.

15. The method according to claim 11, wherein the step of injecting further comprises injecting the treatment fluid into the matrix of the formation.

* * * * *